J. R. FOUCH.
TRACTOR DEVICE.
APPLICATION FILED FEB. 7, 1916.
1,218,388.
Patented Mar. 6, 1917.
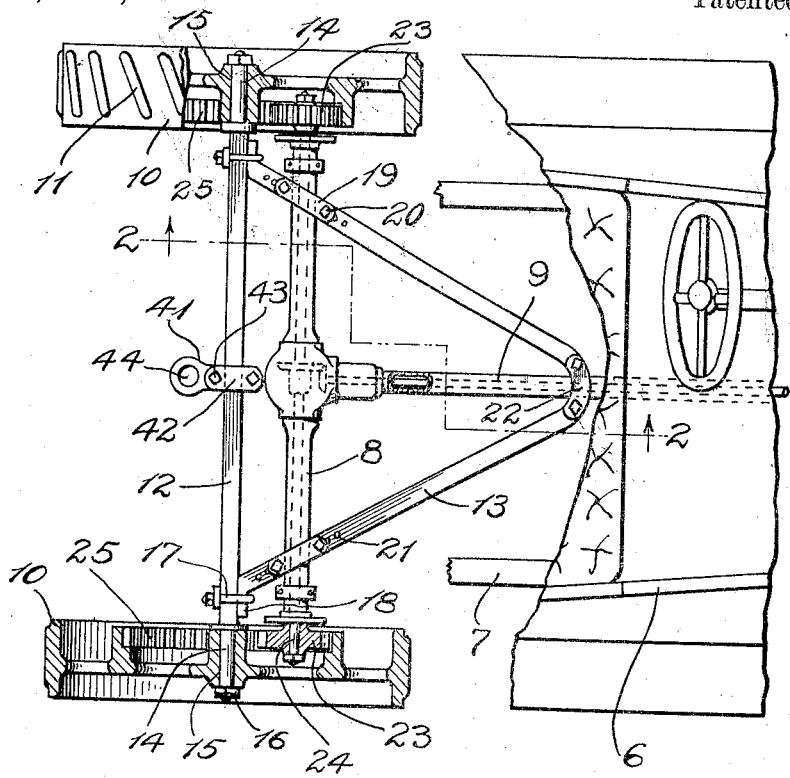
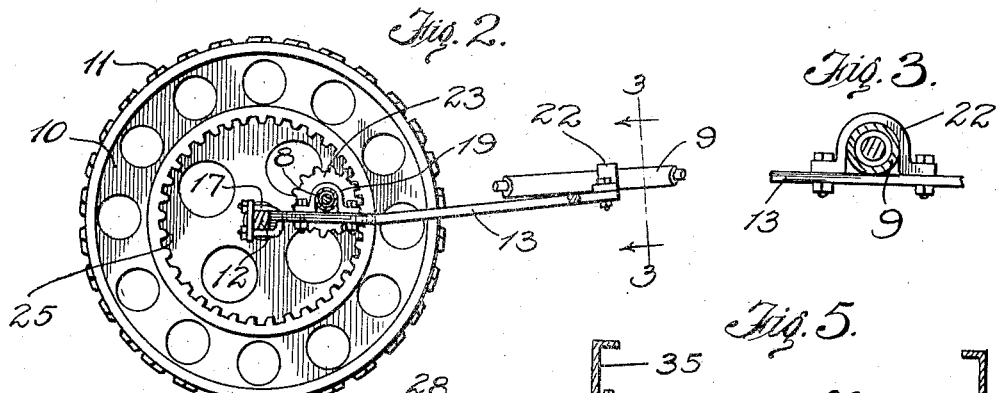
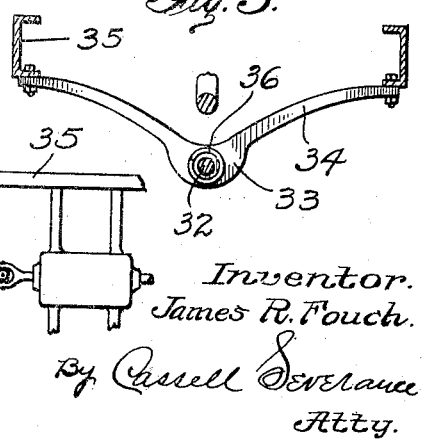
Inventor.
James R. Fouch.
By Cassell Severance
Atty.
Witness:
E. R. Pollard

UNITED STATES PATENT OFFICE.

JAMES R. FOUCH, OF LOS ANGELES, CALIFORNIA.

TRACTOR DEVICE.

1,218,388.  Specification of Letters Patent.  Patented Mar. 6, 1917.

Application filed February 7, 1916. Serial No. 76,551.

*To all whom it may concern:*

Be it known that I, JAMES R. FOUCH, a citizen of the United States, residing at Los Angeles, in the county of Los Angeles and State of California, have invented certain new and useful Improvements in Tractor Devices, of which the following is a specification.

This invention relates to improvements in traction devices and has particular relation to mechanism for converting vehicles of various types into vehicles having greater traction power, and especially into vehicles adapted to operate as tractors, such as are commonly employed in various agricultural pursuits.

It is an object of the invention to provide a traction mechanism which may be readily applied to any ordinary vehicle, and especially to a vehicle designed for road travel, whereby the vehicle is adapted for use on loose, uneven surfaces or ground or on cultivated ground, the vehicle practically becoming a tractor.

It is also an object of the invention to provide a tractor attachment which may be secured upon the running gear of a road vehicle, broad tractor wheels being substituted for the usual road drive wheels of the vehicle.

With these and other objects in view the invention comprises certain novel constructions, combinations and arrangements of parts as will be hereinafter more fully described and claimed.

In the accompanying drawing forming a part of this specification:

Figure 1 is a view partially in section and partially in top plan of vehicle, the parts being broken away to show the arrangement when the vehicle is converted into a tractor, embodying the features of the present invention.

Fig. 2 is a vertical section view taken upon the line 2—2 of Fig. 1.

Fig. 3 is a detail sectional view taken upon the line 3—3 of Fig. 2.

Fig. 4 is a fragmentary view showing a portion of the chassis and the running gear of a vehicle with the tractor mechanism of this invention applied to the said chassis as well as to the casing of the drive axle.

Fig. 5 is a transverse sectional view taken upon the line 5—5 of Fig. 4.

Fig. 6 is a detail fragmentary sectional view of the cross bar connection interposed between the tractor mechanism and the chassis of the form of device shown in Fig. 4.

The traction or tractor mechanism of this invention is designed to make it possible to employ any ordinary light road vehicle for heavier work, and particularly for work as a tractor in agricultural pursuits, as for instance in moving over soft, loose or cultivated ground, whereby the device makes it possible to draw or move cultivating implements and mechanisms over the ground. Practical embodiments of the invention have been illustrated in the accompanying drawing and the details and features of the invention will now be set forth, reference being had thereto. In the said drawing, 6 indicates the body portion of a passenger vehicle, 7 the chassis or main frame, 8 the casing of the rear or driving axle, and 9 the casing of the drive shaft communicating motion from the engine to the drive shaft. All these parts may be of any usual or ordinary type, and may be used to represent the parts of light road vehicles or heavier passenger carrying vehicles or the like. The mechanism of the present invention is adapted for easy connection and attachment to the parts mentioned, without the necessity of any change therein, other than the removal of the drive wheels which are commonly employed in road travel.

The tractor attachment preferably comprises traction wheels 10 generally made with a broad ground engaging traction tread, which may be roughened if desired as indicated at 11. These traction wheels are mounted upon a suitable frame preferably having an axle 12 and a yoke or attaching portion 13, the axle is provided at its ends with journals 14 adapted to engage journal bearings 15 formed in the hubs of the wheels 10. Nuts 16 or other holding means are employed for movably retaining the wheels in place on the axle 12. The yoke or frame 13 is preferably rigidly secured to the axle 12, as by means of clips 17, applied to the out turned end portions 18 formed upon said yoke. The yoke 13 is usually of an angular shape and is adapted to be clamped to the axle casing 8 in any suitable manner for quick attachment or removal. Thus arched clamping bars or plates 19 may be applied around the said casing 8 and securely fastened to the yoke 13 by bolts 20, passed through holes 21 formed in the yoke permitting of an adjustment of the same with respect to the axle 8. The inner or bowed end of the yoke 13 is secured to the casing 9 of the drive shaft by a clip or bent clamp bar 22, whereby the yoke is readily fastened to said casing.

The motive power for the traction wheels 10 is taken from the drive axle of the vehicle and any suitable chain of intermediate driving means may be employed within the spirit of this invention. An effective means is shown in the drawing where gear pinions 23 are shown applied to the ends 24 of the drive shaft, from which the usual road drive wheels have been removed. The said pinions are secured to the drive shaft in the same way that the drive wheels were, and are therefore adapted to be rotated thereby. These gear pinions 23 mesh with the teeth of internal gears 25 carried by the tractor wheels 10. The internal gears 25 are usually formed on, or secured upon the spokes of the tractor wheels as shown in Figs. 1 and 2 of the drawing. It will be readily understood that other means of imparting movement from the drive shaft of the vehicle to the tractor wheels may be employed as for instance sprocket wheels and connecting chains or gearing of any kind, without departing in the least from the spirit of the invention.

While the tractor mechanism may be applied to the casing of the drive shaft as above described, it will be evident that it may also be connected with the chassis of the vehicle if preferred. As shown in Fig. 4 a yoke or frame member 26 may be used having its outer ends turned outwardly as at 27 to carry or form the journals of the tractor wheels 28. In this instance a cross brace bar 29, is generally employed, the ends of which are preferably clamped at 30 to the yoke, just inside the journal end portions thereof. The yoke is adapted to be clamped at 31 to the axle casing of the vehicle and projects forward therefrom, its inner forward end being provided with a reduced portion forming a bolt 32 which engages an aperture or bearing 33 formed in the central depressed portion of a cross bar 34. The said cross bar connects the side bars of the chassis 35 to which bars it is rigidly fastened. The said bar 34 is so shaped as not to interfere with the drive shaft casing of the vehicle and is therefore usually centrally depressed as clearly shown in Figs. 5 and 6. The bolt 32 extends through the bar or aperture 33 and springs 36 and 37 are applied thereon, one on each side of the bar 34. A shoulder 38 upon the yoke 26 limits the position of the spring 36 upon one side of the bar 34, while a nut 39 and a washer 40 limit the position of the spring 37 on the other side of said bar 34 as will be clearly understood by reference to Fig. 6 of the drawing. The movement of the chassis with respect to the case of the rear axle will thus be accommodated, without preventing the proper holding of the tractor frame in place.

The tractor mechanism is of course designed to make it possible for the vehicle to pull other mechanisms and particularly farming implements of various kinds. For this reason the tractor frame is preferably provided with means for connecting such implements thereto. Thus as shown in Fig. 1 a movable clevis 41 is adjustably secured upon the cross bar of the tractor frame or yoke, as for instance to the axle 12. A clamp plate or clip 42 is usually employed secured by bolts 43 so that the clevis can be set and fastened to the shaft 12 at any desired point along its length to accommodate the particular cultivating implement to be employed, to the position desired relative to the tractor and to properly suit it to the desired work. The clevis is provided with an eye or apertured portion 44 to facilitate the ready attachment of implements to the clevis.

While the frame or yoke of the tractor has been shown of an angular form, it will be evident that a rectangular frame may be used or a frame having any other desired shape, and which can be readily attached or removed from the running gear of the vehicle, within the spirit and scope of the invention.

It will be observed also that the minor details of the invention may be considerably changed and that mechanical equivalents may be substituted for some of the parts shown and described, all within the spirit of the invention. It will be seen that in applying the tractor mechanism that it is only necessary to remove the usual drive wheels of the vehicle, in order to adapt it to receive the mechanism of the tractor and that it is only necessary to remove the tractor mechanism and restore the vehicle wheels in order to have the said vehicle ready for road use in the ordinary way. The ready adaptability of the mechanism to any automobile or motor vehicle will thus be apparent as well as the ease and facility with which the changes can be made.

The adjustment of the yoke frame with respect to the axle casing 8 permitted by the holes 21, makes it possible to change the size of the gears and vary the power and speed of the parts as may be desired.

What is claimed is:

1. A propelling traction mechanism for vehicles comprising a frame adapted to be clamped upon the rear axle casing of a vehicle and having bracing portions engaging the casing of the power transmission shaft and tractor wheels carried by said frame and having broad ground engaging treads, whereby the vehicle will be adaptable for use on soft or broken ground.

2. A tractor attachment for motor vehicles comprising a frame adapted to be clamped upon the drive axle casing of the vehicle and adjustably engaging the casing of the transmission drive shaft, pinions adapted to take the place of the vehicle drive wheels, and to be driven by the drive axle of the vehicle, and gears upon the tractor wheels for receiving motion from said pinions.

3. A tractor attachment for motor vehicles comprising a yoke frame having means for adjustably securing it to the casing of a vehicle drive axle, and having means for bracing it with respect to the casing of the vehicle drive shaft, a draft beam held by said yoke, tractor wheels carried by said yoke frame having drive gears thereon and pinions adapted to mesh with said drive gears and to receive their motion from the drive axle of the vehicle.

4. A tractor attachment for motor vehicles or automobiles comprising a yoke adapted to be clamped upon the running gear of the vehicle, a transverse axle, an adjustable clevis member mounted upon said transverse axle for connecting mechanism and attachments to the tractor attachment and tractor wheels mounted upon said transverse axle, said tractor wheels supporting said yoke and the drive mechanism of the vehicle, whereby the vehicle may be converted into a tractor.

In testimony whereof, I have hereunto set my hand, in presence of two witnesses.

JAMES R. FOUCH.

Witnesses:
CASSELL SEVERANCE,
EARLE R. POLLARD.